United States Patent [19]
Santoro

[11] Patent Number: 6,037,593
[45] Date of Patent: Mar. 14, 2000

[54] CATOPTRIC OPTICAL SYSTEM FOR DETECTING MOTION OF A RADIANT SOURCE

[75] Inventor: Scott R. Santoro, Vancouver, Canada

[73] Assignee: Ledalite Architectural Products, Inc., Langley, Canada

[21] Appl. No.: 09/034,612

[22] Filed: Mar. 3, 1998

[51] Int. Cl.[7] .................................................. G01J 5/08
[52] U.S. Cl. ........................ 250/353; 250/342; 250/349; 250/DIG. 1
[58] Field of Search .................................. 250/342, 349, 250/353, DIG. 1

[56] References Cited

U.S. PATENT DOCUMENTS

| | | | |
|---|---|---|---|
| 3,413,468 | 11/1968 | Astheimer | 250/338.1 |
| 4,087,688 | 5/1978 | Keller | 250/342 |
| 4,479,056 | 10/1984 | Zierhut | 250/342 |
| 4,645,930 | 2/1987 | Zierhut | 250/342 |
| 4,670,655 | 6/1987 | Zierhut | 250/342 |
| 4,709,152 | 11/1987 | Müller et al. | 250/342 |
| 5,006,712 | 4/1991 | Keller | 250/353 |

*Primary Examiner*—Constantine Hannaher
*Assistant Examiner*—Albert Gagliardi
*Attorney, Agent, or Firm*—Stoel Rives LLP

[57] ABSTRACT

A catoptric optical system enhances the ability of a radiation sensor to detect motion of a radiant source within a region of a three-dimensional space without need for a polyethylene lens array. A preferred embodiment of the system includes first and second pairs of spaced-apart concave reflector elements arranged to form a chamber having a radiation reflective interior with a rectangular opening at each of input and output ends. The reflective elements of each of the first and second pairs are positioned in opposed relationship and separated by respective first and second distances. A two-element radiation sensor having a top surface is positioned proximal to the output end of the chamber. The first and second distances separating the reflective elements of each pair and the amounts of curvature of the reflective elements of each pair cooperate to establish for detection by the radiation sensor discrete zones of sensitivity that correspond to distinct angles of incidence of radiant flux that propagates from the region of the three-dimensional space and strikes the radiation sensor. A three-dimensional fan of zones of sensitivity is created by multiple reflections from all four interior surfaces of the reflective chamber formed by the reflector elements. The three-dimensional fan of zones of sensitivity is similar to that created by an array of lenses. The radiation sensor receives the reflected incident radiant flux at a position corresponding to a zone of sensitivity where the radiant source is located.

14 Claims, 4 Drawing Sheets

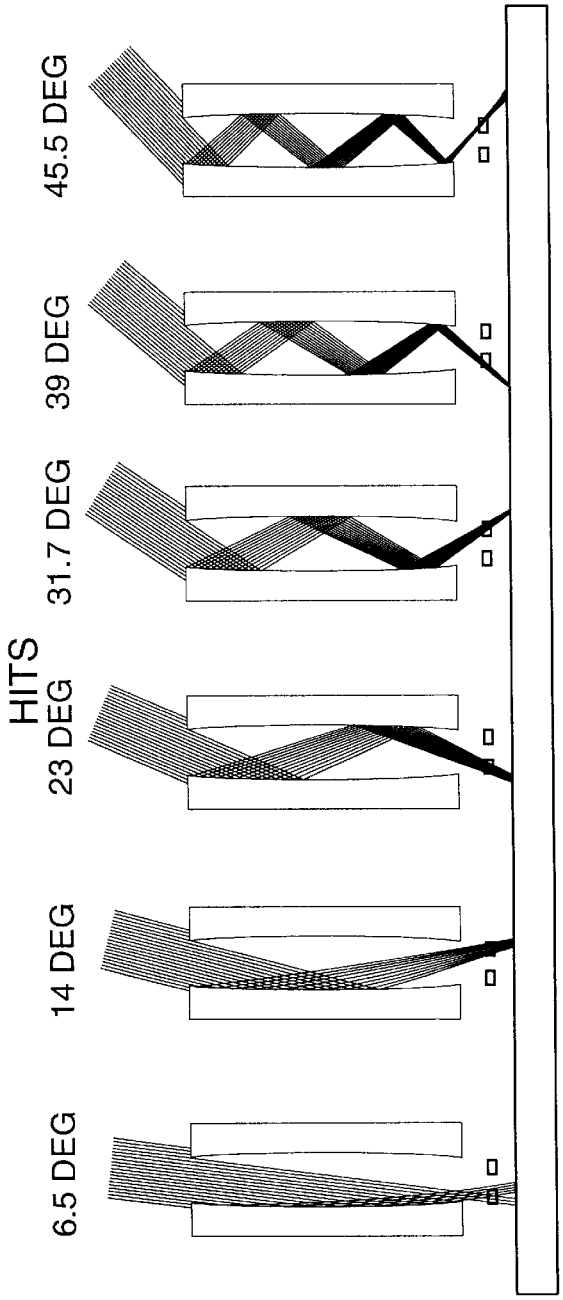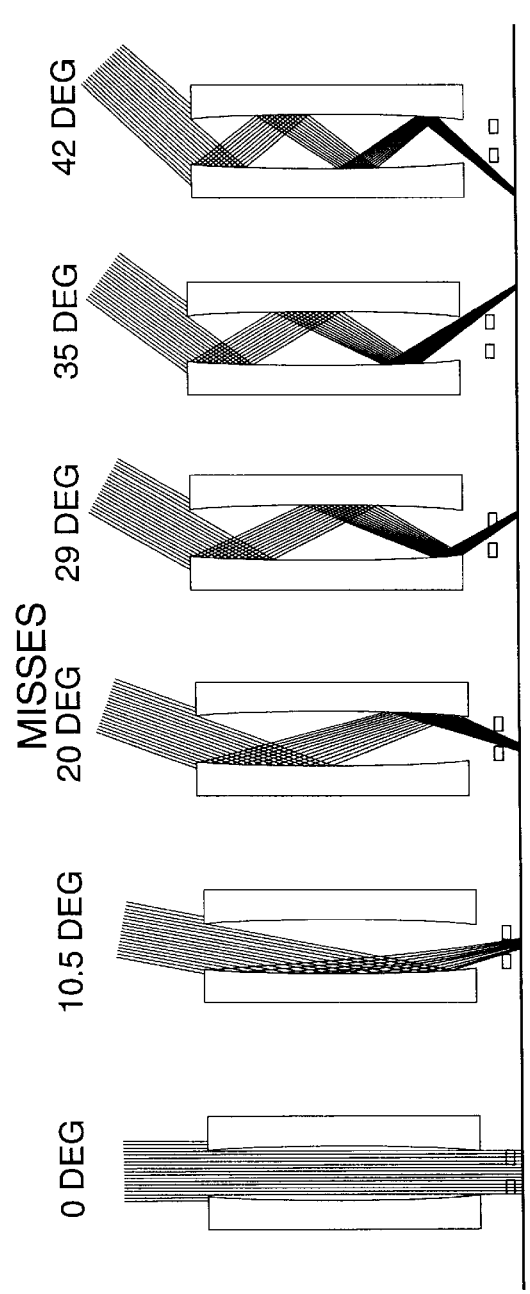
FIG. 6A  HITS
FIG. 6B  MISSES

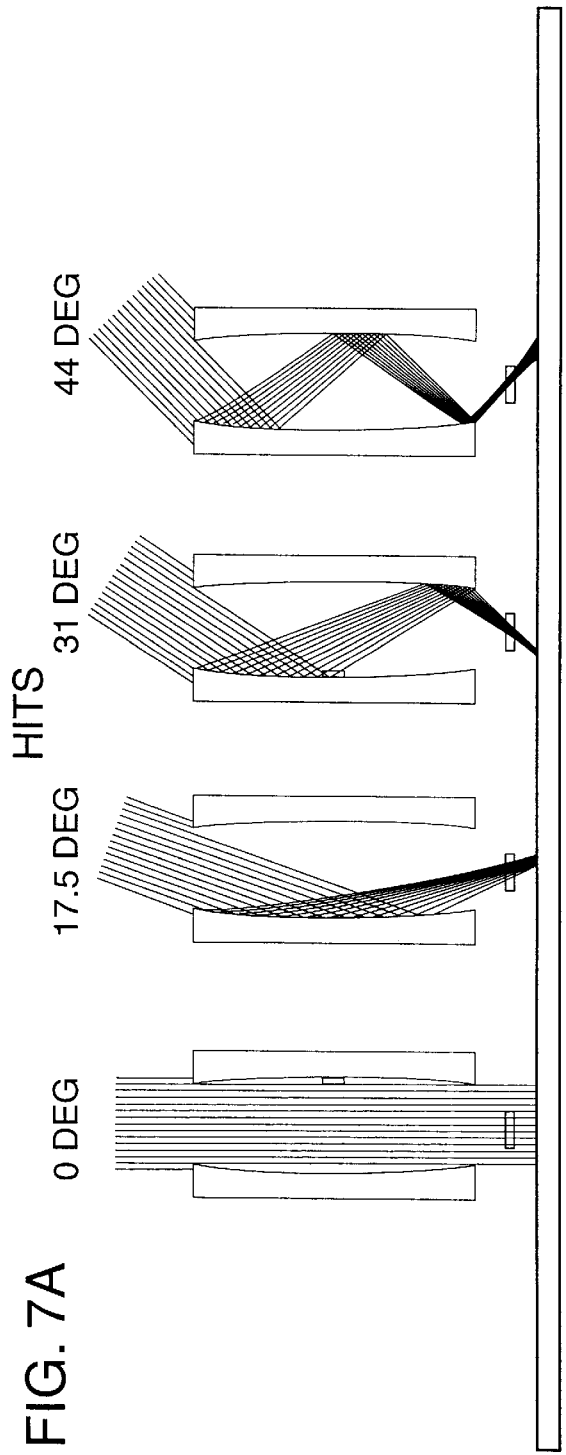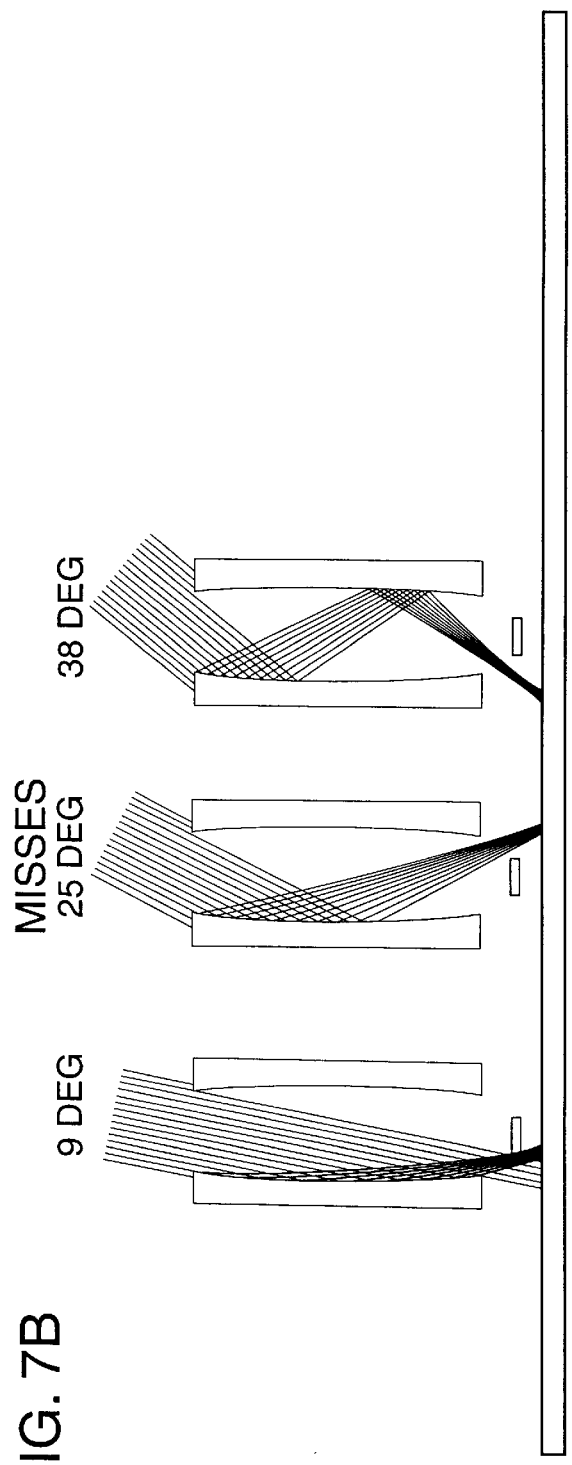
FIG. 7A
FIG. 7B

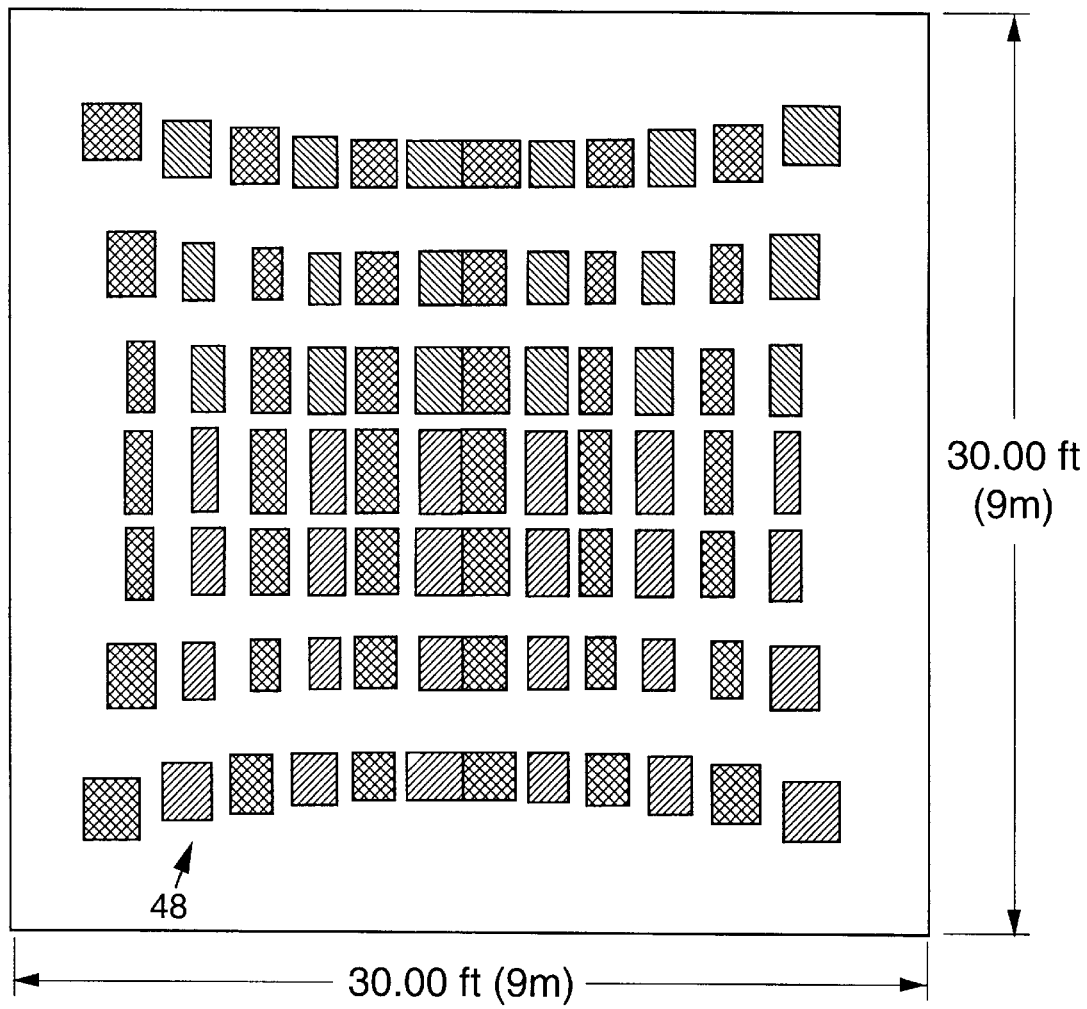
30.00 ft (9m)
30.00 ft (9m)
Sensor Pointed Down 10 ft (3m) above plane.
 Zones of sensitivity for first sensor element 40.
 Zones of sensitivity for second sensor element 42.
FIG. 8

CATOPTRIC OPTICAL SYSTEM FOR DETECTING MOTION OF A RADIANT SOURCE

TECHNICAL FIELD

The present invention relates to motion detection systems and, more particularly, to a catoptric optical system that senses variations in radiant flux emanating from a radiant source as it moves within a three-dimensional space.

BACKGROUND OF THE INVENTION

Optical systems of different types have been designed to enhance the ability of a radiation flux sensor to detect motion of a radiant source within a three-dimensional space. The most common application of this technology is in passive infrared occupancy sensors.

Passive infrared detectors are sensitive to warm objects such as human bodies that radiate most of their thermal energy in the far region of the infrared spectrum between 6 and 10 microns. The detector is sensitive to sudden changes in the amount of the far infrared light it receives and produces a small electrical voltage as its temperature changes by a few thousandths of a degree. Once thermal equilibrium is reached, the detector no longer produces an electrical signal.

The typical optical system for motion detection uses an array of lenses all focused on a passive infrared sensing element. This array of lenses creates beams ("zones") of sensitivity emanating in the directions at which the lenses are focused. The result is a three-dimensional fan of zones of sensitivity. A radiant source, e.g., a person, moving across the field of view of the detector will cross one or more of these zones, so that the change in amount of received thermal energy as the person moves from zone to zone will produce a changing electrical voltage that can be detected.

An embodiment of such an optical system uses two passive infrared sensing elements mounted parallel to each other. The two sensing elements produce electrical pulses of opposite polarity upon receiving changing amounts of radiant flux and a null pulse upon receiving equal amounts of radiant flux. As a radiant source moves across the zones of sensitivity created by the lens array, the sensing elements produce alternating positive and negative pulses. These pulses can be more reliably detected by associated sensor electronics than the output from a single sensing element. The use of two passive infrared sensing elements also advantageously doubles the number of detection zones.

A disadvantage of this type of detector is that the plastic Fresnel lens arrays typically used are relatively large, typically at least 15 mm in diameter, in comparison to the sizes of a sensing element and its mechanical housing. This is so because the only common plastic material that is transparent (but with relatively low transmittance) in the far infrared region is polyethylene. The far infrared region is the region of the spectrum in which passive infrared sensors are most sensitive. (Other common plastics and glass are essentially opaque to far infrared light.) Polyethylene is a relatively soft plastic, which makes it difficult to mold small-scale features onto its surface. Another disadvantage of this type of detector is that images formed by the array of lenses overlap and thereby reduce the contrast of individual images. Consequently, the separation of the sensor field of view into zones is incomplete.

U.S. Pat. No. 5,006,712 describes a catoptric (reflective) optical system in which a radiation detector detects movement in an optical field. The optical system is composed of a first pair of parallel flat reflective surfaces that are perpendicular to a second pair of flat reflective surfaces that converge toward each other from a relatively wide opening toward a relatively narrow opening where a dual-element passive infrared sensor is positioned. The two parallel surfaces use multiple reflections to create alternating zones of sensitivity, and the two converging surfaces collect a necessary amount of radiant flux for reliable detection by the passive infrared sensor. This optical system has several drawbacks in that it creates zones of sensitivity in only one dimension, does not compensate for losses resulting from multiple reflections and the inverse cosine law as the angle of incidence increases, and has no focusing power.

SUMMARY OF THE INVENTION

An object of the invention is to provide a compact, catoptric optical system that enhances the ability of a radiation sensor to recognize changes in radiant flux in the absence of low-transmittance polyethylene lens arrays.

The present invention is a catoptric optical system that enhances the ability of a radiation sensor to detect motion of a radiant source within a region of a three-dimensional space without need for a polyethylene lens array. A preferred embodiment of the system includes first and second pairs of spaced-apart concave reflector elements arranged to form a chamber having a radiation reflective interior with a rectangular opening at each of input and output ends. The reflective elements of each of the first and second pairs are positioned in opposed relationship and separated by respective first and second distances. The concave surfaces of the reflector elements of each of the first and second pairs are parallel to each other.

A radiation sensor having a top surface is positioned proximal to the output end of the chamber. The first and second distances separating the reflective elements of each pair and the amounts of curvature of the reflective elements of each pair cooperate to establish for detection by the radiation sensor discrete zones of sensitivity that correspond to distinct angles of incidence of radiant flux that propagates from the region of the three-dimensional space and strikes the radiation sensor. Multiple reflections of radiant flux from all four interior surfaces of the reflective chamber formed by the reflector elements create a three-dimensional fan of zones of sensitivity, and each of the reflections is magnified by the curved surface of the reflector the radiant flux strikes.

A two-element sensor is positioned near the exit opening. Selecting the curvatures of the reflective elements and the first and second distances to focus the incident radiant flux received at the input end by appropriate amounts creates within the chamber specific numbers of reflections of incident radiant flux for specific angles of incidence to which the zones of sensitivity correspond. The radiation sensor receives the reflected incident radiant flux at a position corresponding to a zone of sensitivity where the radiant source is located. The three-dimensional fan of zones of sensitivity created by multiple reflections of radiant flux from the four interior surfaces of the reflective chamber is similar to that created by an array of lenses.

Additional objects and advantages of the present invention will be apparent from the detailed description of a preferred embodiment thereof, which proceeds with reference to the accompanying drawings.

BRIEF DESCRIPTION OF THE DRAWINGS

FIGS. 6A and 6B show in the X-Z plane ray traces of radiant flux incident upon and then reflected by the catoptric optical system for, respectively, angles at which incident flux strikes the sensor elements and angles at which incident flux misses the sensor elements.

FIGS. 7A and 7B show in the Y-Z plane ray traces of radiant flux incident upon and then reflected by the catoptric optical system for, respectively, angles at which incident flux strikes the sensor elements and angles at which incident flux misses the sensor elements.

FIG. 8 is a plot displaying the zones of sensitivity created by the two sensor elements of the catoptric optical system of FIG. 1.

DETAILED DESCRIPTION OF PREFERRED EMBODIMENT

Figure 1:
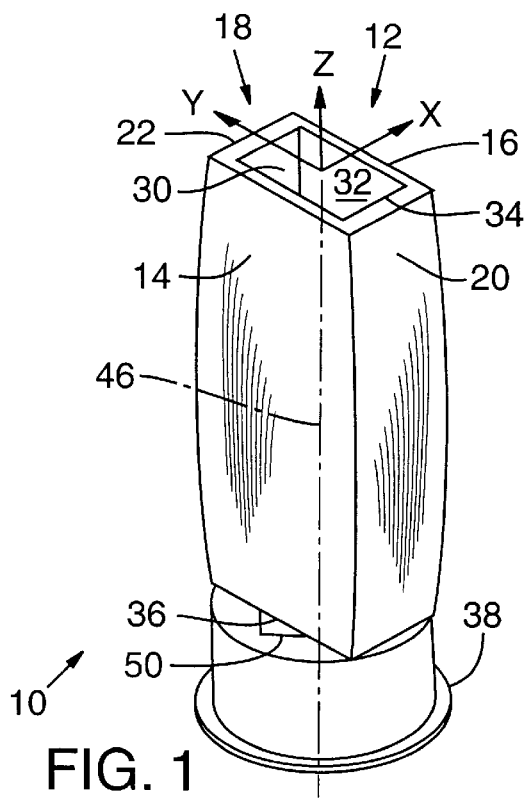
FIG. 1 is an isometric view of the catoptric optical system of the present invention.

FIGS. 1–5 show a catoptric optical system 10 that includes a first pair 12 of spaced-apart, opposed concave reflector elements 14 and 16 and a second pair 18 of spaced-apart, opposed concave reflector elements 20 and 22. Reflector elements 14, 16, 20, and 22 are preferably in the form of cylindrical segments.

First and second pairs 12 and 18 of reflector elements are assembled to form a chamber 30 having a radiation reflective interior 32 with rectangular openings at an input end 34 and an output end 36. A radiation sensor 38 comprising two sensor elements 40 and 42 located adjacent to each other in substantially co-planar relationship relative to a radiation sensor top surface 44 is positioned adjacent output end 36 of chamber 30. Sensor elements 40 and 42 are preferably Model 5192 Parallel Opposed Dual Pyroelectric IR Detectors manufactured by Eltec Instruments, Inc., Daytona Beach, Fla.

The flow of radiant flux through chamber 30 can be analyzed in terms of its components in Cartesian coordinates. The X and Y components are aligned perpendicular to a major axis 46 of the sensor elements 40 and 42, and the Z component is aligned parallel to the major axis 46 nadir, as shown in FIG. 1. Reflectors 14 and 16 control the X component of the incident flux, and reflectors 20 and 22 control the Y component of the incident flux.

Figure 3:
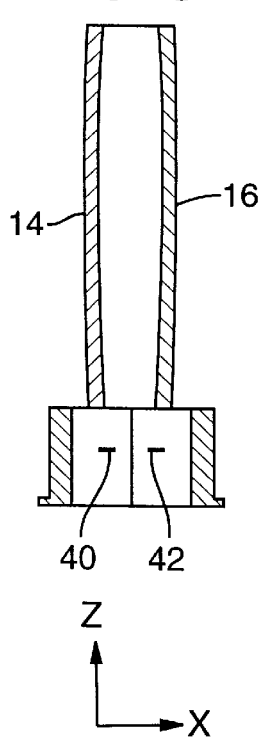
FIG. 3 is a sectional view taken along lines 3—3 of FIG. 2.
Figure 4:
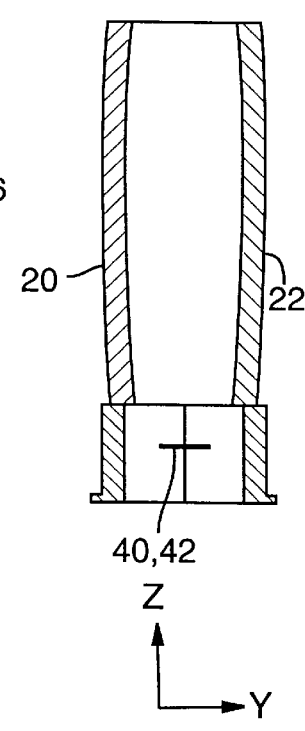
FIG. 4 is a sectional view taken along lines 4—4 of FIG. 2.

The curvature of reflectors 14, 16, 20, and 22 shown in FIGS. 3 and 4 performs two functions in optical system 10. The first function is to focus the incident flux, as shown in FIGS. 6A, 6B, 7A, and 7B. As the incidence angle of the flux increases, the number of reflections also increases. With each reflection, the flux density is magnified, the magnification increasing with incidence angle and thereby providing optical system 10 with inverse cosine law loss compensation. The second function is to ensure that, for a specific number of reflections, there is a distinct angle at which the flux will be incident upon each of sensor elements 40 and 42, as shown in FIGS. 6A, 6B, 7A, and 7B. Zones of sensitivity appear at each of these angles. The angle at which each zone appears depends on the curvature and spacing of reflectors 14, 16, 20, and 22.

Figure 2:
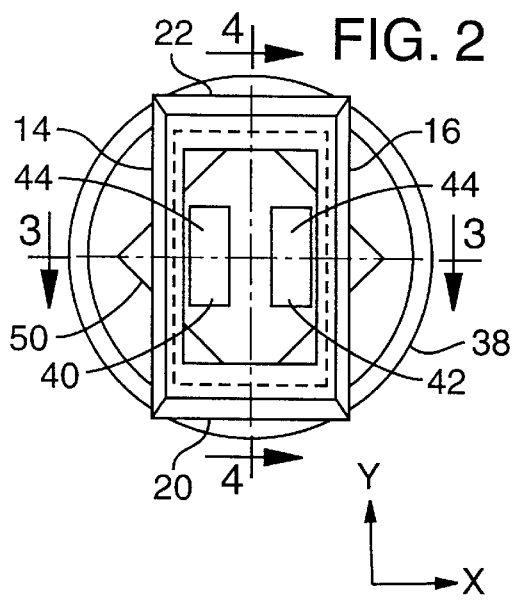
FIG. 2 is a top view of the catoptric optical system of FIG. 1.

Incident flux having both X and Y components are reflected by both pairs 12 and 18 of reflectors to create a grid pattern 48 of zones of sensitivity, as shown in FIG. 8. (Grid pattern 48 represents a pattern obtained at a reference plane about 3 meters below input end 34 of optical system 10.) An advantage of this pattern (particularly for use in most architectural settings) in comparison to round lens arrays used in many passive infrared motion detectors is that grid pattern 48 is relatively rectangular. Between top surface 44 of sensor 38 and sensor elements 40 and 42 is an area containing a far infrared filter 50, as shown in FIGS. 1 and 2. Filter 50 is typically opaque to near infrared light, to which passive infrared sensing elements 40 and 42 would otherwise respond.

In a preferred embodiment, the zones of sensitivity alternate from one sensor element to the other as a consequence of proper alignment of reflectors 14 and 16. Reflector elements 14 and 16 are positioned such that if their curved surfaces were to be extended to a plane defined by the top surfaces of sensor elements 40 and 42, reflector elements 14 and 16 would intersect the plane at the outside edges of sensor elements 40 and 42, as shown in FIGS. 2 and 3. This alignment essentially allows the lower portion of a reflector element to double the sensor element collecting area with no gap. Otherwise, the first reflection on a reflector element positioned adjacent to a sensor element would create its own zone of sensitivity and in effect cause an alternating pattern of two zones of one sensor element followed by two zones of the other sensor element.

The placement of reflector elements 20 and 22 (positioned perpendicular to the major axis of the sensor) determines where the zones of sensitivity in the Y-Z plane of sensitivity will be aligned. If the zones of sensitivity in the Y-Z plane are to be distinct and nonoverlapping, reflector elements 20 and 22 are spaced apart such that there is a significant gap between the end of the sensor element and its adjacent reflector element, as shown in FIG. 4. Otherwise, the zones of sensitivity will blend together, thereby decreasing the overall ability of radiation sensor 38 to detect movement within its field of view.

Figure 5:
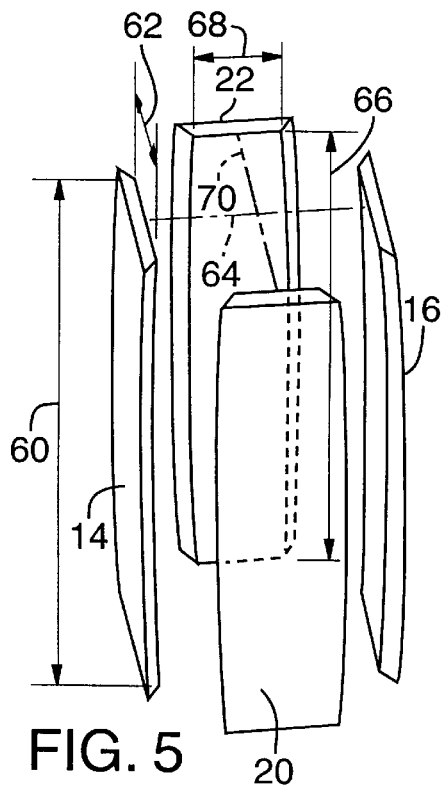
FIG. 5 is an exploded view of the concave reflector elements of the catoptric optical system of FIG. 1.

With particular reference to FIG. 5, in a preferred implementation, each of reflector elements 14 and 16 is in the form of a cylindrical segment having a 125 mm radius and has a 20 mm length 60 and a 8.65 mm width 62. Reflector elements 14 and 16 are separated by a 3.23 mm distance 64. Each of reflector elements 20 and 22 is in the form of a cylindrical segment having a 175 mm radius and has a 20 mm length 66 and a 8.0 mm width 68. Reflector elements 20 and 22 are separated by a 5.6 mm distance 70.

In an alternative preferred embodiment, reflector elements 14, 16, 20, and 22 can be canted outward from sensor elements 40 and 42 to improve the collection of radiant flux by optical system 10. This would, however, affect the distribution of the zones and the cutoff angle of sensor 38.

Although the present invention has been described with reference to passive infrared sensors that are sensitive to far infrared radiation, skilled persons will appreciate that the optical system 10 may be combined with radiation flux sensors to bands of radiation throughout the electromagnetic spectrum.

It will be obvious to those having skill in the art that many changes may be made to the details of the above-described embodiment of this invention without departing from the underlying principles thereof. The scope of the present invention should, therefore, be determined only by the following claims.

I claim:

1. A catoptric optical system that enhances the ability of a radiation sensor to detect motion of a radiant source within a region of a three-dimensional space, comprising:

first and second pairs of spaced-apart curved reflector elements arranged to form a chamber having a radiation reflective interior with an opening at each of first and second ends, each of the reflector elements having a curved surface with an amount of curvature, and the reflective elements of each of the first and second pairs positioned in opposed relationship and separated by respective first and second distances;

a radiation sensor having a top surface positioned proximal to one of the first and second ends of the chamber; and the first and second distances separating the reflective elements of each pair and the amounts of curvature of the reflective elements of each pair cooperating to establish for detection by the radiation sensor discrete zones of sensitivity that correspond to distinct angles of incidence of radiant flux that propagates from the region of the three-dimensional space and strikes the radiation sensor.

2. The optical system of claim 1 in which the curved surfaces of the reflector elements are concave.

3. The optical system of claim 2 in which the concave surfaces are in the shape of a cylindrical segment.

4. The optical system of claim 1 in which the amounts of curvature of the curved reflector elements of the first pair are different from the amounts of curvature of the curved reflector elements of the second pair.

5. The optical system of claim 1 in which the curved surfaces of the reflector elements of each of the first and second pairs are parallel to each other.

6. The optical system of claim 5 in which the openings at the first and second ends are of rectangular shape.

7. The optical system of claim 1 in which the radiation sensor comprises two sensor elements positioned adjacent to each other and in substantially coplanar relationship to the top surface.

8. The optical system of claim 7 in which the two sensor elements have a total surface area that fits substantially within the opening of the chamber to which the two sensor elements are proximally positioned.

9. A method of providing, in an optical system for detecting motion of a radiant source within an area of a three-dimensional space, a three-dimensional fan of zones of sensitivity created in the absence of a lens array, comprising:

providing a chamber for receiving incident radiant energy, the chamber having an opening at each of input and output ends and including first and second pairs of spaced-apart curved reflector elements that form a radiation reflective interior, the reflective elements of each of the first and second pairs positioned in opposed relationship and separated by respective first and second distances;

forming a fan of zones of sensitivity by selecting the curvatures of the reflective elements and the first and second distances to focus the incident radiant flux received at the input end by amounts that create within the chamber specific numbers of reflections of incident radiant flux for specific angles of incidence to which the zones of sensitivity correspond; and positioning at the output end of the chamber a radiation sensor to receive the reflected incident radiant flux at a position corresponding to a zone of sensitivity where the radiant source is located.

10. The method of claim 9 in which the curved reflector elements are of concave shape.

11. The method of claim 10 in which the concave shape is that of a cylindrical segment.

12. The method of claim 9 in which the amounts of curvature of the reflector elements of the first pair are different from the amounts of curvature of the reflector elements of the second pair.

13. The method of claim 9 in which the radiation sensor comprises two sensor elements positioned adjacent and in substantially coplanar relationship to each other.

14. The method of claim 13 in which the two sensor elements have a total surface area that fits substantially within the opening at the output end of the chamber.

* * * * *